Figure 1:
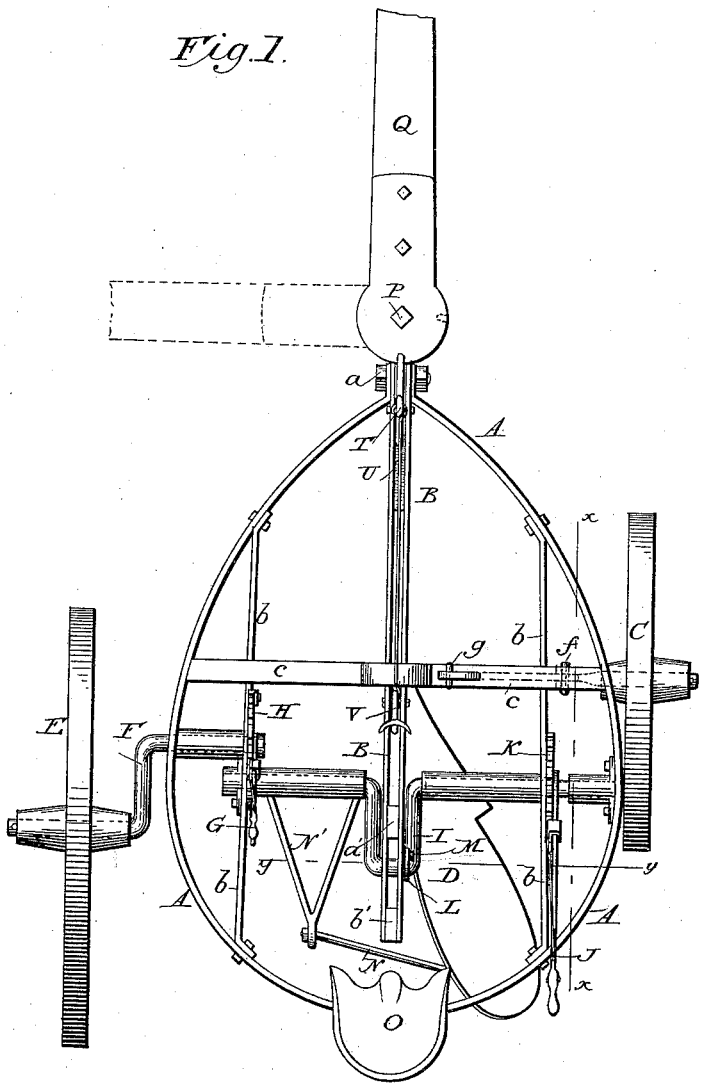

(No Model.)

2 Sheets—Sheet 1.

R. R. GASKILL.
SULKY PLOW.

No. 330,889.

Patented Nov. 24, 1885.

WITNESSES
Sidney P Hollingsworth
W. H. Shipley,

INVENTOR
R. R. Gaskill
By his Attorney
P. T. Dodge.

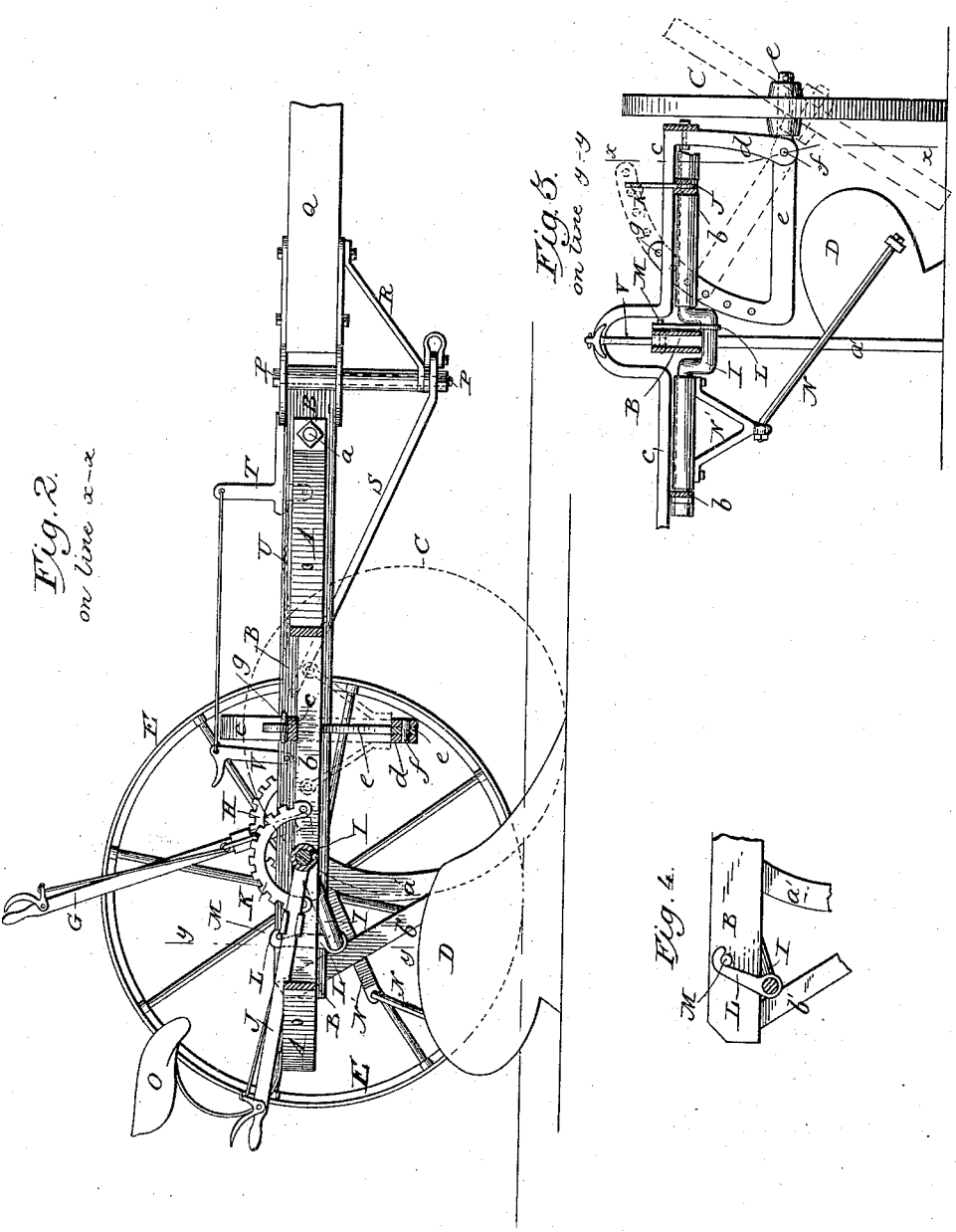

UNITED STATES PATENT OFFICE.

ROLAND R. GASKILL, OF TOPEKA, KANSAS.

SULKY-PLOW.

SPECIFICATION forming part of Letters Patent No. 330,889, dated November 24, 1885.

Application filed June 30, 1885. Serial No. 170,296. (No model.)

*To all whom it may concern:*

Be it known that I, ROLAND R. GASKILL, of Topeka, in the county of Shawnee and State of Kansas, have invented certain Improvements in Sulky-Plows, of which the following is a specification.

This invention has reference more particularly to two-wheeled sulky-plows in which a mold-board plow, preferably constructed without a landside in order to avoid side friction, is combined with a wheeled frame and with adjusting device, whereby the plow is placed under the control of the operator riding upon the machine.

The invention has reference to an improved construction of the frame, to the improved connection of the tongue therewith, to the arrangement of the wheels with respect to the plow in order to prevent a lateral tendency of the plow, and to devices for effecting the vertical adjustment of the plow proper, as hereinafter fully explained and specifically claimed.

Referring to the accompanying drawings, Figure 1 represents a top plan view of my plow; Fig. 2, a longitudinal vertical section of the same on the line *x x;* Fig. 3, a transverse section on the line *y y* of the preceding figure; Fig. 4, a detail view showing the hook attached to the crank of the axle to hold the plow in the ground.

In the drawings, A represents the main frame, consisting of a single bar of metal doubled or bent into an oval form, the two ends extended forward parallel with each other in order to form a bearing for the plow-beam B, which is inserted between them and secured by means of a transverse pivot, *a*, this arrangement permitting the rear end of the beam, which has an ordinary mold-board plow, D, secured thereto, to swing vertically at its rear end with respect to the frame. To the inside of the main frame are secured rigidly two longitudinal bars, *b*, one at each side. Midway of the length of the frame, or thereabout, a cross-bar, *c*, is secured rigidly in position, one end of this bar being extended downward in the form of an arm, *d*, or bolted to an arm of like form, which serves as a pivot-support for the axle *e*, the outer end of which carries the furrow-wheel C. The axle *e* is connected to the arm *d* by a horizontal pivot, *f*, so that the axle may be tipped in order to place the wheel in an upright or a laterally-inclined position, as occasion may demand. The inner end of the axle *e* is extended upward through the bar *c*, and provided with a series of holes to receive fastening-pins *g*, by means of which the axle and wheel may be secured in their different positions. In place of the pins, other equivalent fastening devices may be employed.

The landside of the machine is carried by the ground-wheel, mounted on a cranked axle, F, the inner end of which is connected to the frame in any appropriate manner which will admit of its rotation, in order to raise and lower the side of frame with respect to the wheel, so that it may be maintained in a horizontal position when traveling to and from the wheel. It is preferred to form the inner end of the axle F into a journal, and seat the same, as shown, in a sleeve secured between the main frame and the inside bar, *b*.

For the purpose of turning the axle and securing the same in position, I attach thereto a hand-lever, G, provided with a latch which engages a rack-bar, H, secured to the frame.

It is to be noted that the furrow-wheel C is located in advance of the land-wheel E and in line, or practically so, with the point of the plow, while the land-wheel is opposite the plow-standard, this arrangement of the wheels with relation to each other and to the plow avoiding that tendency which sulky-plows commonly exhibit to swing toward the land in consequence of the resistance against the face of the plow. By my arrangement of parts I cause the plow to travel in a straight line and without employing a landside.

For the purpose of raising the plow, I mount transversely in the rear part of the frame a horizontal crank-shaft, I, the cranked portion of which acts beneath the beam between the standard proper, *a'*, and the brace *b'*, as shown in the various figures. This axle is provided with a hand-lever, J, having a latch which engages a rack-plate, K, so that as the lever is turned the crank will raise or lower the beam.

In order to hold the plow forcibly downward when the nature of the soil requires, I attach to the crank a hooked arm, L, which may engage over a pin, M, on the beam, as shown in the drawings. The beam is preferably constructed, as shown, of two parallel parts bolted or riveted to intervening blocks, so as to admit of the hook and the plow-standard being inserted between them.

In order to secure the plow against lateral motion and strain, I join to the rear edge of the mold-board a brace, N, which extends thence upward to an arm, N', extending rearward from a sleeve on the cranked axle, so that in the act of lifting the plow the arm end will swing upward with the brace. On the rear end of the frame I mount a driver's seat, O, and to the front end of the beam I connect by a vertical pivot, P, a horizontal tongue or draft-pole, Q. This pole has top and bottom plates bolted thereto above and below the beam and extended rearward to embrace the pivot-pin which passes through the beam. In order to form a socket or bearing for this pivot, the beam is commonly constructed of a single bar doubled or bent backward upon itself; the forward end being fashioned into an eye or socket. The pivot-pin P is continued downward below the head through a sleeve, and receives upon its lower end the rear end of a forwardly-extended brace, R, bolted to the tongue and the forward end of a draft-bar, S, the rear end of which will be secured to the beam.

In order to prevent lateral motion of the tongue when required, I pivot on the frame a latch, T, acted upon by a spring, U, and arranged to engage in a notch in the tongue-plate. The latch is released, when required, by means of a rod extending thence to a lever, V, pivoted to the beam in position to be actuated by the foot of the operator.

It will be observed that the cross-bar c is arched or elevated at the center to admit of the elevation of the beam.

In operating my plow it may be turned without lifting the plow proper from the ground after first releasing the latch T, so as to permit the swiveling action of the tongue.

Having thus described my invention, what I claim is—

1. In a sulky-plow, the main frame consisting of a metal bar doubled or bent to an approximately circular form, with its two ends extended forward in parallel lines, in combination with the two carrying-wheels applied thereto, and the plow-carrying beam seated between the forward ends of the frame and secured thereto by a hinged pivot.

2. In a wheel-plow, the combination of the main frame, the two wheels mounted on opposite sides thereof, the plow-carrying beam united to the forward end of the frame by a horizontal pivot, the tongue or draft-pole united to the forward end of the beam by a vertical pivot, and locking devices to prevent the lateral motion of the tongue when required.

3. In a wheel-plow, the combination of the following elements: the main frame, the two carrying-wheels mounted on opposite sides of said frame, the plow-carrying beam united to the forward end of the frame by a horizontal pivot, the crank-shaft mounted in the frame and acting to lift the rear end of the beam, the draft-pole united directly to the beam by a vertical pivot, and the locking devices to prevent lateral motion of the beam.

4. In combination with the wheel-frame, the rising and falling beam jointed thereto and provided with the plow at its rear end, the arm N', secured to and arranged to rotate with the crank, and the brace N, extending in a substantially horizontal position from the distal end of the arm to the plow, whereby the brace is caused to support the plow laterally without material tendency to hold the same down.

5. The wheeled frame and the plow-beam jointed thereto to rise and fall, in combination with the lifting-crank and the means for locking the same, and the hook or arm attached to the crank and adapted to engage the beam for the purpose of depressing the same, substantially as described.

In testimony whereof I hereunto set my hand this 28th day of May, 1885, in the presence of two attesting witnesses.

ROLAND R. GASKILL.

Witnesses:
  J. L. WINNIE,
  ALEX. BUTLER.